United States Patent
Jin et al.

(10) Patent No.: US 12,389,073 B2
(45) Date of Patent: Aug. 12, 2025

(54) INFORMATION PROCESSING METHOD AND APPARATUS, AND DEVICE AND STORAGE MEDIUM

(71) Applicant: Beijing Zitiao Network Technology Co., Ltd., Beijing (CN)

(72) Inventors: Siyao Jin, Beijing (CN); Qiu Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/853,561

(22) PCT Filed: Mar. 31, 2023

(86) PCT No.: PCT/CN2023/085531
§ 371 (c)(1),
(2) Date: Oct. 2, 2024

(87) PCT Pub. No.: WO2023/186107
PCT Pub. Date: Oct. 5, 2023

(65) Prior Publication Data
US 2025/0168454 A1    May 22, 2025

(30) Foreign Application Priority Data
Apr. 2, 2022    (CN) .......................... 202210350116.2

(51) Int. Cl.
*H04N 21/25* (2011.01)
*H04N 21/2187* (2011.01)
(Continued)

(52) U.S. Cl.
CPC ....... *H04N 21/472* (2013.01); *H04N 21/2187* (2013.01); *H04N 21/4316* (2013.01)

(58) Field of Classification Search
CPC ............ H04N 21/472; H04N 21/2187; H04N 21/4316; H04N 21/4788; H04N 21/431; H04N 21/2743
See application file for complete search history.

(56) References Cited

U.S. PATENT DOCUMENTS

| 2018/0144396 A1 | 5/2018 | Yin et al. |
| 2020/0213678 A1 | 7/2020 | Pleiman |

(Continued)

FOREIGN PATENT DOCUMENTS

| CN | 105353942 A | 2/2016 |
| CN | 106533924 A | 3/2017 |

(Continued)

OTHER PUBLICATIONS

China National Intellectual Property Administration, Office Action and Search Report Issued in Application No. 202210350116.2, Sep. 6, 2023, 21 pages.

(Continued)

*Primary Examiner* — Alazar Tilahun
(74) *Attorney, Agent, or Firm* — Alleman Hall & Tuttle LLP

(57) ABSTRACT

Embodiments of the present inventions discloses an information processing method and apparatus, a device and a storage medium. The method comprises: in response to receiving an instruction of displaying a livestream room control in a session interface of a target session, determining that a preset livestream room corresponding to the livestream room control is in a livestreaming state and at least one preset event in the preset livestream room is in a triggered state, displaying the livestream room control in the session interface, and displaying associated information of the preset event in a first area in the session interface.

20 Claims, 5 Drawing Sheets

(51) Int. Cl.
   *H04N 21/431* (2011.01)
   *H04N 21/47* (2011.01)
   *H04N 21/472* (2011.01)

(56) References Cited

U.S. PATENT DOCUMENTS

| | | | |
|---|---|---|---|
| 2021/0336912 A1 | 10/2021 | Ahn et al. | |
| 2022/0021908 A1 | 1/2022 | Zhang | |
| 2022/0024035 A1* | 1/2022 | Zhang | H04N 21/2187 |
| 2022/0150594 A1* | 5/2022 | Yao | H04L 51/046 |
| 2023/0144560 A1* | 5/2023 | Liu | H04L 65/612 |
| | | | 709/231 |
| 2023/0276101 A1* | 8/2023 | Tashiro | H04N 21/4784 |
| | | | 725/23 |

FOREIGN PATENT DOCUMENTS

| | | |
|---|---|---|
| CN | 111049732 A | 4/2020 |
| CN | 111147881 A | 5/2020 |
| CN | 111641840 A | 9/2020 |
| CN | 113099262 A | 7/2021 |
| CN | 113473164 A | 10/2021 |
| CN | 113656133 A | 11/2021 |
| CN | 113689244 A | 11/2021 |
| CN | 113727134 A | 11/2021 |
| CN | 113949888 A | 1/2022 |
| CN | 114071171 A | 2/2022 |
| CN | 114143563 A | 3/2022 |
| CN | 114257829 A | 3/2022 |
| CN | 114727146 A | 7/2022 |
| JP | 2023513299 A | 3/2023 |
| WO | 2020207249 A1 | 10/2020 |
| WO | 2021082583 A1 | 5/2021 |

OTHER PUBLICATIONS

Wang, M., "Webcast video storage and file," Chinese Archives, Nov. 2016, 2 pages.

ISA China National Intellectual Property Administration, International Search Report Issued in Application No. PCT/JP2023/085531, Jul. 11, 2023, WIPO, 6 pages.

China National Intellectual Property Administration, Supplementary Search Report Issued in Application No. 202210350116.2, Feb. 6, 2024, 2 pages.

Extended European Search Report for European Application No. 23778471.5, mailed Mar. 18, 2025, 11 pages.

Notice of Refusal for Japanese Application No. 2024-557491, mailed Apr. 1, 2025, 16 pages.

* cited by examiner

INFORMATION PROCESSING METHOD AND APPARATUS, AND DEVICE AND STORAGE MEDIUM

This application is a U.S. National Stage Application of PCT Application Serial No. PCT/CN2023/085531, filed Mar. 31, 2023, which claims the priority to Chinese Patent Application No. 202210350116.2, filed with the Chinese Patent Office on Apr. 2, 2022, which are incorporated herein by reference in their entireties.

FIELD

Embodiments of the present disclosure relate to the technical field of computers, and relate to a method and apparatus for information processing, a device, and a storage medium, for example.

BACKGROUND

Rapid development of the information technology and popularization of the mobile Internet keep enriching functions of applications.

SUMMARY

An information processing method and apparatus, a device, and a storage medium are provided in embodiments of the present disclosure.

In a first aspect, a method of information processing is provided in an embodiment of the present disclosure. The method comprises:
  determining, in response to receiving an instruction of displaying a livestream room control in a session interface of a target session, whether a preset livestream room corresponding to the livestream room control satisfies a preset display condition, wherein the preset display condition comprises that the preset livestream room is in a livestreaming state and at least one preset event in the preset livestream room is in a triggered state; and
  displaying the livestream room control in the session interface and displaying associated information of the at least one preset event in a first area in the session interface in response to determining that the preset livestream room corresponding to the livestream room control satisfies the preset display condition.

In a second aspect, an apparatus for information processing is provided in an embodiment of the present disclosure. The apparatus comprises:
  a determination module configured to determine, in response to receiving an instruction of displaying a livestream room control in a session interface of a target session, whether a preset livestream room corresponding to the livestream room control satisfies a preset display condition, wherein the preset display condition comprises that the preset livestream room is in a livestreaming state and at least one preset event in the preset livestream room is in a triggered state; and
  a display module configured to display the livestream room control in the session interface and display associated information of the at least one preset event in a first area in the session interface in response to determining that the preset livestream room corresponding to the livestream room control satisfies the preset display condition.

In a third aspect, an electronic device is provided in an embodiment of the present disclosure. The electronic device comprises a memory, a processor and a computer program stored on the memory and runnable on the processor, the computer program, when executed by the processor, implementing the method for information processing according to the example of the present disclosure.

In a fourth aspect, a computer-readable storage medium is provided in an embodiment of the present disclosure. The computer-readable storage medium stores a computer program, the computer program, when executed by a processor, implementing the method for information processing according to the example of the present disclosure.

DETAILED DESCRIPTION OF EMBODIMENTS

Figure 1:
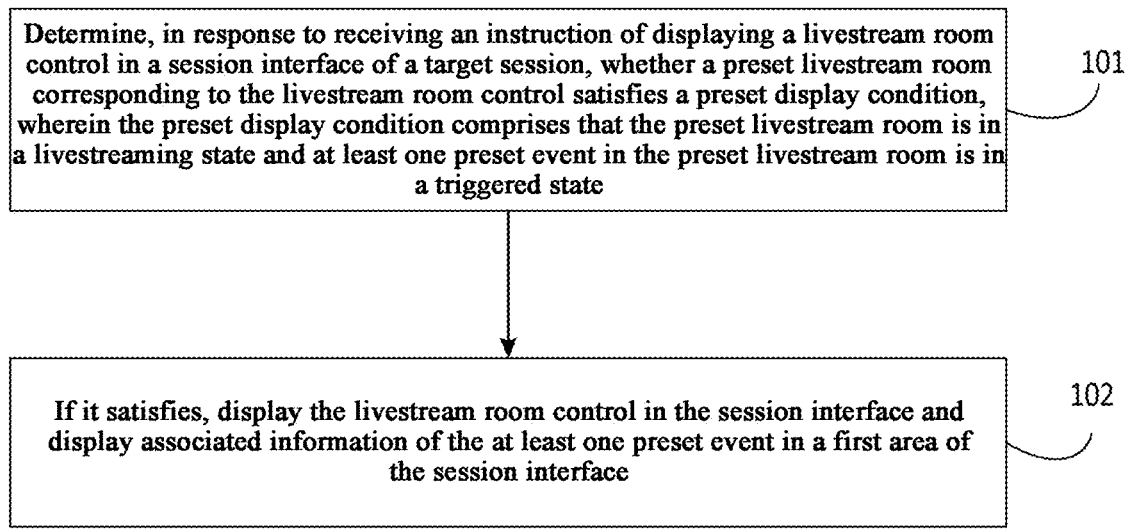
FIG. 1 is a schematic flow chart of a method for information processing according to an example of the present disclosure.

As functions of applications keep increasing, a wide range of applications can have both of a livestream function and a session function.

A livestream interface and a session interface are two different interfaces in an application. When a user chats with another user on the session interface, it is difficult to know a dynamic update in a livestream room and it is easy to miss livestream content that the user is interested in.

In view of the above condition, a method and apparatus for information processing, a device, and a storage medium are provided in embodiments of the present disclosure.

The embodiments of the present disclosure will be described below with reference to the accompanying drawings. Although some embodiments of the present disclosure are shown in the accompanying drawings, it should be understood that the present disclosure can be implemented in various forms and should not be construed as limitation to the embodiments described herein. On the contrary, these embodiments are provided for a more thorough and complete understanding of the present disclosure. It should be understood that the accompanying drawings and embodiments of the present disclosure are for illustrative purposes only and are not intended to limit the scope of protection of the present disclosure.

It should be understood that various steps described in the method embodiments of the present disclosure can be executed in different orders and/or in parallel. Furthermore, the method embodiments can comprise additional steps and/or steps shown for omitting execution. The scope of the present disclosure is not limited in this respect.

The terms "comprise", "comprise" and variations thereof used herein are open-ended, i.e. "comprising, but not limited to" and "including, but not limited to". The term "based on" refers to "at least partially based on". The term "an embodiment" means "at least one embodiment"; the term "another embodiment" means "at least one other embodiment"; and the term "some embodiments" means "at least some embodiments". Related definitions of other terms will be provided in the following description.

It should be noted that the concepts such as "first" and "second" mentioned in the present disclosure are merely intended to distinguish different apparatuses, modules or units, and are not intended to define the order or interdependence of the functions executed by these apparatuses, modules or units.

It should be noted that the modification with "a", "an" or "a plurality of" mentioned in the present disclosure is illustrative rather than limitative, and those skilled in the art should understand that "one or more" should be understood unless explicitly stated otherwise in the context.

The names of messages or information exchanged between a plurality of apparatuses in the embodiments of the present disclosure are merely for illustrative purposes, and are not intended to limit the scope of these messages or information.

Alternative features and embodiments are provided in each of the embodiments described below, various features described in the embodiments can be combined to form multiple alternative embodiments, and each numbered example should not be considered as only one example.

FIG. 1 is a schematic flow chart of a method for information processing according to an example of the present disclosure. The method may be executed by an apparatus for information processing. The apparatus may be implemented by at least one of software and hardware, and may generally be integrated in an electronic device. The electronic device may be a mobile device such as a mobile phone, a smart watch, a portable android device (PAD), and a personal digital assistant (PDA), or may be other devices such as desktop computers. As shown in FIG. 1, the method comprises:

step 101, determine, in response to receiving an instruction of displaying a livestream room control in a session interface of a target session, whether a preset livestream room corresponding to the livestream room control satisfies a preset display condition, wherein the preset display condition comprises that the preset livestream room is in a livestreaming state and at least one preset event in the preset livestream room is in a triggered state.

In the example of the present disclosure, the session interface may be an interface in a preset application, and the preset application may provide a livestream function and a session function, and may be mounted in an electronic device. A target session may comprise at least two session members. When two session members are comprised, a one-on-one chat session may be considered. When at least three session members are comprised, a group chat session may be considered. The session member may send or view a session message in the session interface, and the form of the session message is not limited, and may comprise text, emoji, pictures, voice, video, or controls (such as session cards), for example.

Illustratively, in the preset application, the session member may perform livestream as a streamer account, and the session member may further watch livestream as a viewer account.

Illustratively, the livestream room control may be understood as a control related to the preset livestream room, and the specific content and form are not limited. For example, the livestream room control may be configured to display livestream information of the preset livestream room, the livestream room control may be further configured to provide a livestream room entrance of the preset livestream room, and the livestream room control may be further configured to display recommendation information of the preset livestream room. Display of the instruction of displaying the livestream room control in the session interface of the target session may be generated under a trigger of a user, or may be automatically generated by the preset application, which is not limited.

Illustratively, the preset event may comprise an event that may be triggered in the livestream room, and its event type is not limited. For example, the preset event may comprise a resource issuance event. Correspondingly, the preset event being in the triggered state may comprise that a resource is being issued in the preset livestream room, i.e. the issue of the resource has started but not completed yet.

Step 102, display the livestream room control in the session interface and display associated information of the at least one preset event in a first area in the session interface in response to determining that the preset livestream room corresponding to the livestream room control satisfies the preset display condition.

Illustratively, after it is determined that the preset display condition is satisfied, the livestream room control is displayed in the session interface, and the associated information of the preset event may be displayed in the first area in the session interface. The first area may be a preset fixed area, such as the top of the session interface. The first area may also be an area determined dynamically according to current conditions. For example, the first area is associated with a display position of the livestream room control. Illustratively, the display position of the first area changes along with a change of the display position of the livestream room control.

Illustratively, the associated information of the preset event may comprise state information of the preset event, state information of an associated object of the preset event, or attribute information of the associated object of the preset event.

For example, the preset event is a resource issuance event. The state information of the event may comprise a time that the issuance ends, etc., the associated object may be a resource, and the associated information may be attribute information of the resource, such as a total number of resources, a number of resources that have been issued, and a type of the resource, etc.

Illustratively, the associated information displayed in the first area in the session interface may correspond to the at least one preset event, or may correspond to at least two or more preset events.

Figure 2:
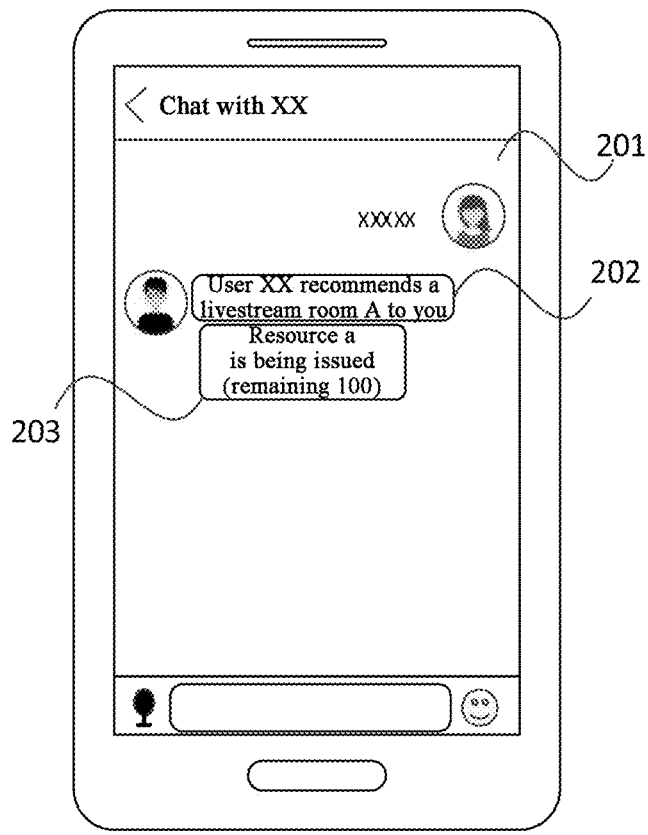
FIG. 2 is a schematic diagram of an interface according to an example of the present disclosure.

FIG. 2 is a schematic diagram of an interface according to an example of the present disclosure. As shown in FIG. 2, a target session is a one-to-one chat session, and the session comprises two session members. A session message between the session members may be displayed in a session interface 201. One session member shares a livestream room A in the session, and it may be considered that an instruction of displaying a livestream room control in the session interface of the target session is received. In this case, the livestream room A becomes a preset livestream room. The livestream room control may be a control configured to display recommendation information of the livestream room A, and the preset event may comprise an event of resource issuance. Assuming that the livestream room A is in a livestreaming state and the resource "a" is being issued, the livestream room control 202 may be displayed in the session interface 201, and associated information of the preset event may be displayed in the first area 203 of the session interface 201, and the associated information may comprise the name "a" of the resource being issued, and may further comprise a number "100" of remaining resources. Another session member may know the associated information of the event that a resource is being issued in the livestream room A by means of the session interface 201 quickly and intuitively, so as to know dynamic updates in the livestream room better.

In an embodiment, if the preset display condition is not satisfied, the livestream room control is displayed in the session interface. That is, the associated information of the preset event may not be displayed in the first area in the session interface.

According to the method for information processing provided in the example of the present disclosure, it is determined that the preset livestream room corresponding to the livestream room control is in the livestreaming state and the at least one preset event in the preset livestream room is in the triggered state in response to receiving the instruction of displaying the livestream room control in the session interface of the target session, such that the livestream room control is displayed in the session interface, and the associated information of the preset event is displayed in the first area in the session interface. With employment of the above embodiments, when the instruction of displaying the livestream room control is received in the current session interface and if it is determined that the corresponding livestream room is in the livestreaming state and the preset event is triggered, while the livestream room control is displayed in the session interface, the associated information of the preset event is displayed. As such, the session member can know the associated information of the preset event currently in the triggered state in the livestream room during a process of chatting in the session interface conveniently, and know the dynamic updates in the livestream room better.

In some embodiments, a first preset association relation exists between the preset livestream room and at least one session member in the target session. That is, the preset livestream room may be understood as a livestream room having a first preset association relation with one or some session members in the target session. The first preset association relation may be set according to actual requirements. For example, the session member is a streamer account of the preset livestream room, or the session member subscribes to the preset livestream room, or the session member pushes the preset livestream room to the target session.

In some embodiments, the first preset association relation existing between the preset livestream room and the at least one session member in the target session comprises: displaying the preset livestream room based on the at least one session member in the target session to the target session, such that the livestream room control is displayed in the session interface of the target session. Such a configuration has the advantage that the associated information of the preset event in the preset livestream room pushed by the session member is displayed in the session interface.

In some embodiments, a target session may be created by a streamer account in a preset livestream room, and a session member in the target session other than the streamer account may be a viewer account. The session member pushing the preset livestream room may comprise a streamer account, or a viewer account. A pushing mode may be in the form of a session message, for example.

In some embodiments, the session interface comprises a second area, the second area is configured to display the livestream room control, and the first area is associated with the second area; and the livestream room control satisfies at least one of the following: the livestream room control is configured to display livestream information of the preset livestream room, and the livestream room control is configured to provide a livestream room entrance of the preset livestream room. Such a configuration has the advantage that the associated information and the livestream information are displayed associatively such that the session member can know livestream content more comprehensively, and the associated information and the livestream room entrance are displayed associatively such that the session member can position the livestream room entrance quickly and enter into the preset livestream room quickly in future when the session member is interested in the associated information. An association mode of the association of the first area with the second area is not limited. For example, a distance between a central position of the first area and a central position of the second area is less than a first preset distance threshold, or a distance between a first boundary of the first area and a second boundary of the second area is less than or equal to a preset distance threshold (for example, an upper boundary of the first area coincides with a lower boundary of the second area), or the first area coincides with the second area (that is, the first area and the second area are the same area).

In some embodiments, the second area and the first area may exist in the same session message, and it may be a session message that is displayed when a preset livestream room is pushed to a target session. For example, the session message displayed when the preset livestream room is pushed to the target session may comprise the first area or not, which is not limited. If the first area is comprised, a preset copy may be displayed in the first area under the condition that a preset display condition is not satisfied. For example, "enter into the livestream room and watch wonderful content" is displayed, or a summary of the content being explained in a preset livestream room is displayed.

Figure 3:
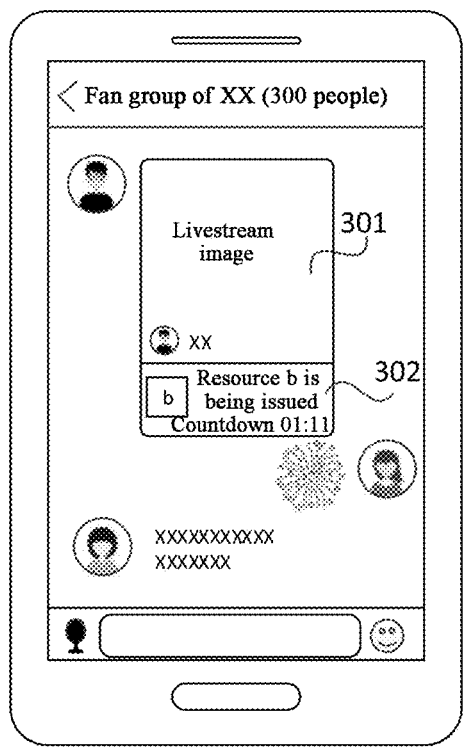
FIG. 3 is a schematic diagram of another interface according to an example of the present disclosure.

Illustratively, FIG. 3 is a schematic diagram of another interface according to an example of the present disclosure. As shown in FIG. 3, assuming that a target session is a fan group created by a streamer XX, and the streamer pushes his/her/their own livestream room (preset livestream room) to a target session, a second area 301 in a session interface is configured to display a livestream room control. The livestream room control displays livestream information of the preset livestream room (such as a livestream image in FIG. 3), provides a livestream room entrance of the preset livestream room (a current user may enter into the preset livestream room by inputting a trigger operation for the second area 301), and displays associated information of an event of resource issuance in a first area 302 below the second area 301, such as a thumbnail image of the issued resource and countdown information of the end of the issuance. The first area 302 and the second area 301 exist in the same session message, and the session message may be a session message when the streamer account pushes the preset livestream room. Assuming that the session message is a session card, the first area 302 and the second area 301 may form a session card jointly.

In some embodiments, the first preset association relation existing between the preset livestream room and the at least one session member in the target session comprises that the session member in the target session comprises a streamer account of the preset livestream room. Such a configuration has the advantage that when there is no session member pushing the preset livestream room to the target session, the associated information can also be displayed automatically to prevent the session member from missing viewing the associated information.

Figure 4:
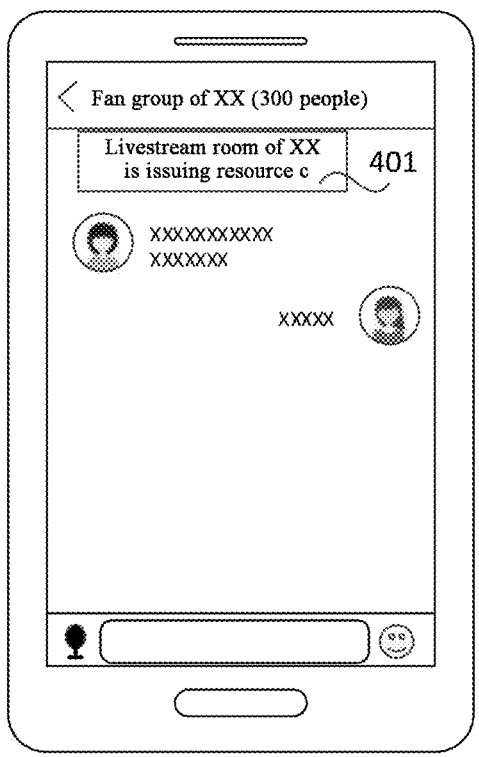
FIG. 4 is a schematic diagram of yet another interface according to an example of the present disclosure.

Illustratively, the target session may be created by the streamer account of the preset livestream room. In a process of livestream of the streamer in the preset livestream room, a current user may be chatting in the target session. In this case, if a preset event enters into a triggered state, a livestream room control may be displayed in a session interface, and associated information of the preset event may be displayed in a first area, such that the current user views the livestream room quickly and conveniently. In an embodiment, a livestream room control may be displayed in the first area. That is, the associated information may be displayed in the livestream room control. FIG. 4 is a schematic diagram of yet another interface according to an example of the present disclosure. As shown in FIG. 4, a livestream room control may be displayed in a first area 401, and associated information may be displayed in the livestream room control as a graphic content of the livestream room control. In an embodiment, if there is no preset event entering into a triggered state currently, the graphic content of the livestream room control may be a reminder message that the preset livestream room is in a livestreaming state, such as "a livestream room of XX is livestreaming". In an embodiment, a first area may be configured to display a preset control (which may be the same as or different from a livestream room control), the preset control may be displayed in the first area in the form of a floating window, and the associated information may be displayed within the preset control.

In some embodiments, the method further comprises: displaying of the first area based on a preset display control mode, wherein the preset display control mode comprises at least one of a display position, a display size, a display state, display duration, and a display interval between two adjacent displays. Such a configuration has the advantage that the display of the preset information can be controlled more flexibly. A control mode for the display position may be preset, or a blank area in the session interface may be also set dynamically as the display position. The control mode for the display size may be set dynamically according to an amount of the content of associated information required to be displayed. The display state may comprise displayed and hidden. When the display state of the first area changes, the content such as a session message in the session interface may also change accordingly. As shown in FIG. 4, when the first area 401 becomes hidden, the display positions of two session messages below can move up to improve utilization of a display space in the session interface. The control mode for the display duration and the display frequency (which may be understood as a display interval between adjacent displays) may be set according to a type of the preset event or a type of the associated information. For example, different types correspond to different display durations, and different types correspond to different display frequencies. Repeated displays may be configured such that occurrence of users missing viewing the associated information may be reduced.

In some embodiments, the at least one preset event comprises an event having a second preset association relation with a current user. The second preset association relation may comprise a relation that the current user subscribes to a preset event, or may comprise a relation that the current user subscribes to a preset event of a preset livestream room, for example. For example, assuming that the current user subscribes to an event "a", the preset event may comprise an event "m" when the current preset livestream room is a livestream room A, and the preset event may also comprise an event "m" when the current preset livestream room is a livestream room B. For another example, assuming that the current user subscribes to the event "m" of the livestream room A and does not subscribe to the event "m" of the livestream room B, the preset event may comprise the event "m" when the current preset livestream room is the livestream room A, and the preset event does not comprise the event "m" when the current preset livestream room is the livestream room B.

In some embodiments, the at least one preset event comprises that a preset resource for which a current user has obtainment permission is issued, and the associated information of the at least one preset event comprises resource attribute information of the issued preset resource. The preset resource may be set according to a type of a preset livestream room. For example, the type of the preset livestream room may be commodity recommendation. The preset resource may comprise a coupon, a blessing bag, etc. The coupon is taken as an example. The resource attribute information may comprise, for example, a coupon type, a coupon value, end time of issuing the coupon, etc. The coupon is still taken as an example. Assuming that the coupon may be received once, if a current user has not received the coupon, the current user can still have the obtainment permission, such that corresponding associated information may be displayed. If the current user has received the coupon, the current user would not have the obtainment permission, such that corresponding associated information may not be displayed.

In some embodiments, the at least one preset event comprises that a preset object associated with the preset livestream room is in a preset state, and the associated information of the at least one preset event comprises at least one of state information and object attribute information of the preset object in the preset state. The preset object may be set according to a type of the preset livestream room. For example, the type of the preset livestream room may be commodity recommendation. The preset object may be a commodity, the preset state may comprise, for example, a discount, a price reduction, time-limited obtaining or a limited-amount obtaining, the state information of the preset object may comprise, for example, discount information (such as 30% discount) or price reduction information (such as current price and historical price), and the object attribute information may comprise a commodity name and a commodity physical image.

In some embodiments, the displaying associated information of the at least one preset event in a first area in the session interface comprises: obtaining, in response to determining a plurality of preset objects currently in the preset state, attribute change indexes of the plurality of preset objects, wherein the attribute change indexes are configured to measure a degree of deviation of a current attribute value of a preset attribute of the preset object from an original attribute value; determining a target preset object according to the attribute change indexes; and displaying at least one of state information and object attribute information of the target preset object in the first area in the session interface. Such a configuration has the advantage that the appropriate target preset object can be determined automatically according to the attribute change index of each preset object, and associated information corresponding to the target preset object can be displayed.

In some embodiments, the attribute change index may be determined by (original attribute value-current attribute value)/original attribute value. When the target preset object is determined according to the attribute change indexes, one or more preset objects having the highest attribute change index may be determined as the target preset object.

Illustratively, the preset object as a commodity is taken as an example. The preset attribute may be a value. If the preset state is discounted, the attribute change index may be determined according to discount information. For example, 30% discount is made, such that the attribute change index may be 0.3. If the preset state is price reduction, the current attribute value may be a current value, such as 20, and the original attribute value may be an original value, such as 25, such that the attribute change index may be 0.2.

In some embodiments, the preset event comprises that a streamer account participates in a first preset theme project, and the associated information of the at least one preset event comprises participation information of the streamer account in the first preset theme project, wherein the first preset theme project comprises interaction between different streamer accounts. The first preset theme project may be, for example, a player killing (PK) project, or a competition project between at least two streamers. The participation information may comprise, for example, related information of an opponent streamer account competing with a current streamer account. The related information is an account identifier (such as an account name or an avatar), and may further comprise game live information, such as whether the current streamer account is ahead of the opponent streamer account, and current game scores of the current streamer account and the opponent streamer account, such that the current user determines whether to enter into the livestream room to watch a game or vote for the streamer conveniently according to his/her/their will after viewing the participation information.

In some embodiments, the preset event comprises that a streamer account participates in a second preset theme project, and the associated information of the at least one preset event comprises project information of the second preset theme project, wherein the second preset theme project comprises interaction between the streamer account and a viewer account. The second preset theme project may be, for example, microphone connection. When a microphone connection function is enabled in the streamer account, prompt information indicating that the microphone connection function has been enabled may be displayed on the session interface, such that the current user determines whether to enter into the livestream room to participate in the microphone connection according to his/her/their demands after viewing the prompt information.

In some embodiments, the displaying associated information of the at least one preset event in a first area in the session interface comprises: obtaining event priority information in response to determining a plurality of preset events currently in the triggered state; determining a target preset event according to the event priority information; and displaying associated information corresponding to the target preset event in the first area in the session interface. Such a configuration has the advantage that when multiple preset events are all in the triggered state, an appropriate target preset event may be determined quickly according to the event priority information, and associated information of the target preset event may be displayed. For example, the event priority information may be set by default by a preset application, or may be set independently by the current user, which is not limited.

In some embodiments, after the displaying associated information of the at least one preset event in the first area in the session interface, the method comprises: update the associated information displayed in the first area in response to detecting that a state of the at least one preset event changes. Such a configuration has the advantage that the associated information can be updated dynamically such that the current user can obtain the dynamic updates of the livestream room more timely and accurately.

In some embodiments, the updating the associated information displayed in the first area in response to detecting that a state of the at least one preset event changes comprises: updating the associated information displayed in the first area according to current progress information in response to detecting that the progress information of the at least one preset event changes. The progress information may be understood as an internal change occurring in a progress of the preset event. For example, type switching, a quantity change, or a countdown time change of the issued preset resource; a change of countdown time of a time-limited discount or a change of the preset object (such as switching from a time-limited discount of a commodity A to a time-limited discount of a commodity B) for another example; and for yet another example, in a PK project, a change of competition scores between the current streamer account and the opponent streamer account, or switching of the opponent streamer account.

In some embodiments, the updating the associated information displayed in the first area in response to detecting that the state of the at least one preset event changes comprises: in response to detecting that the triggered state of a first preset event corresponding to first associated information being currently displayed ends, deciding whether a second preset event in the triggered state exists and switching to displaying the second associated information corresponding to the second preset event in the first area in the session interface in response to that the second preset event in the triggered state exists. Such a configuration has the advantage that the associated information can be updated automatically according to a change of the triggered state of the preset event. In some embodiments, when the second preset event is selected, if there are multiple preset events in the triggered state, the second preset event may be determined according to the event priority information.

For example, the first preset event is that a coupon is issued. After issuance of the coupon is completed or the current user may not receive the coupon anymore, if both commodity discount and blessing bag issuance are in the triggered state, and the priority of the blessing bag issuance is higher than the commodity discount, the blessing bag issuance may be determined as the second preset event. If the commodity discount is not completed after the blessing bag issuance is completed, the commodity discount may be determined as a new second preset event. When the preset event is switched, the associated information displayed in the session interface is updated accordingly.

In some embodiments, after the displaying associated information of the at least one preset event in the first area in the session interface, the method further comprises: enter, in response to a preset trigger operation for the first area, into a livestream interface of the preset livestream room to execute at least one of the following: displaying interface information matching the associated information, and executing an operation matching the associated information automatically. Such a configuration has the advantage that proactive operations of the user may be reduced, and interaction efficiency may be improved. The type of the preset trigger operation is not limited. For example, the type of the preset trigger operation may be click or long press.

In some embodiments, in response to the preset trigger operation for the second area (which may be the same as or different from the preset trigger operation configured to trigger the first area described above), the livestream interface of the preset livestream room is entered into. Such a configuration has the advantage that different ways of entering into the livestream interface are determined according to different areas triggered by the user, such that the interaction is more flexible.

In some embodiments, the executing the operation matching the associated information automatically comprises: when the at least one preset event comprises that a preset resource for which the current user has obtainment permission is issued, adding a preset resource corresponding to the associated information to an account of a current user and displaying a use entrance corresponding to the added preset resource. Such a configuration has the advantage that after the user enters into the livestream room, the user does not need to receive the preset resource and can position the use entrance of the preset resource quickly, thereby improving the interaction efficiency. The display form of the use entrance is not limited. For example, the preset resource is a coupon, the use entrance may be a commodity list that the coupon can be used with, and the commodity list may comprise an obtaining link of each commodity. In addition, when the preset resource corresponding to the associated information is added to the account of the current user, a prompt message of successful obtaining may be displayed on the livestream interface to prompt the user that the preset resource has been successfully received, and the use entrance of the preset resource may be displayed in the success prompt message.

In some embodiments, the displaying the interface information matching the associated information comprises: displaying an access entrance of a preset object corresponding to the associated information when the at least one preset event comprises that the preset object is in a preset state. Such a configuration has the advantages that after the user enters into the livestream room, the user can position the access entrance of the preset object quickly, thereby improving the interaction efficiency. The display form of the access entrance is not limited. For example, the preset object is a commodity, and the access entrance may be an obtaining link of the commodity.

In some embodiments, the displaying the interface information matching the associated information comprises: displaying a virtual resource (virtual gift) selection interface when the preset event comprises that a streamer account participates in a first preset theme project.

In some embodiments, the displaying the interface information matching the associated information comprises: displaying inquiry information of whether to participate in a second preset theme project when the preset event comprises that a streamer account initiates the second preset theme project; and executing the operation matching the associated information automatically comprises: send an application for participating in the second preset theme project automatically when the preset event comprises that the streamer account initiates the second preset theme project.

Figure 5:
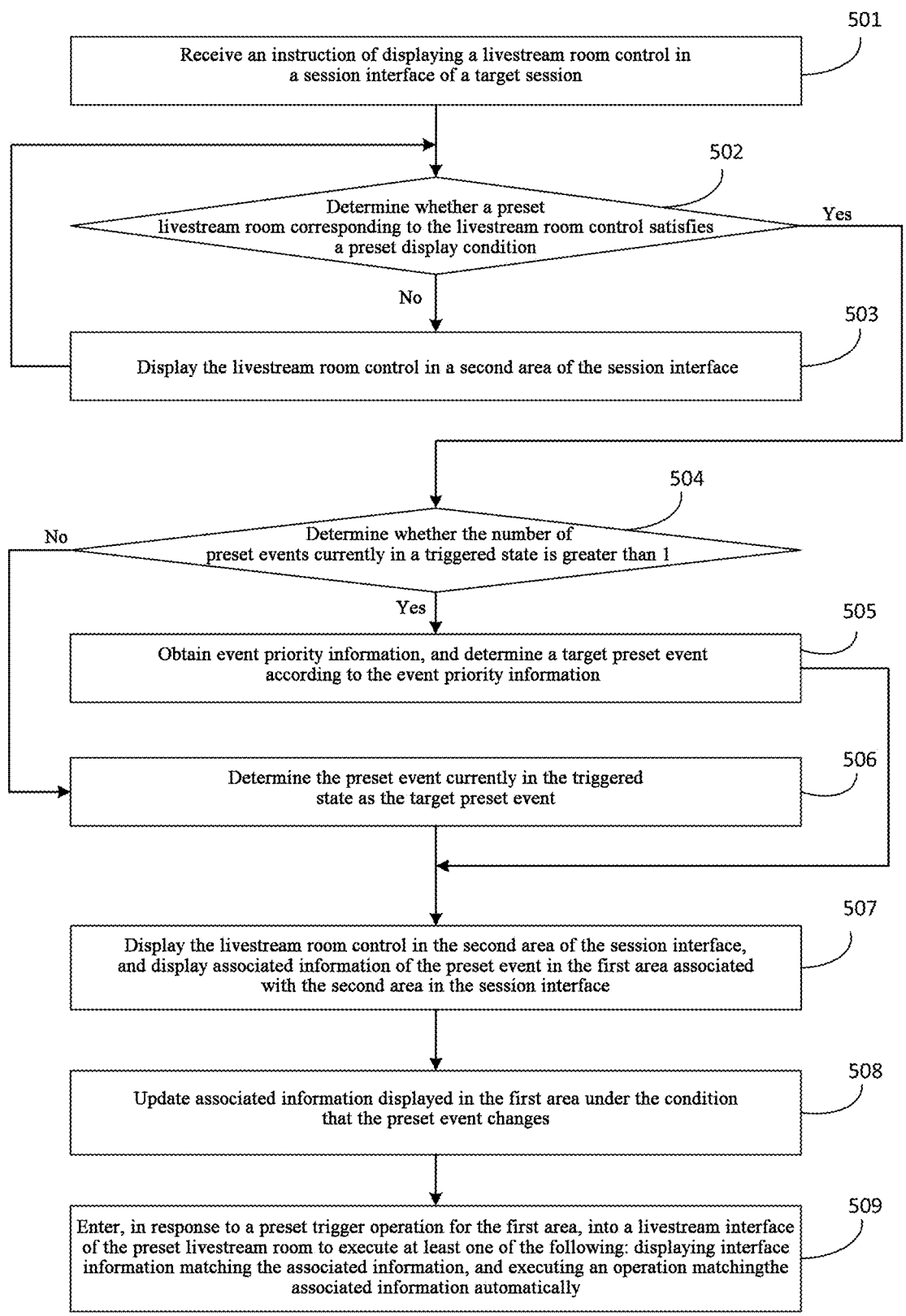
FIG. 5 is a schematic flow chart of a method for information processing according to an example of the present disclosure.
Figure 6:
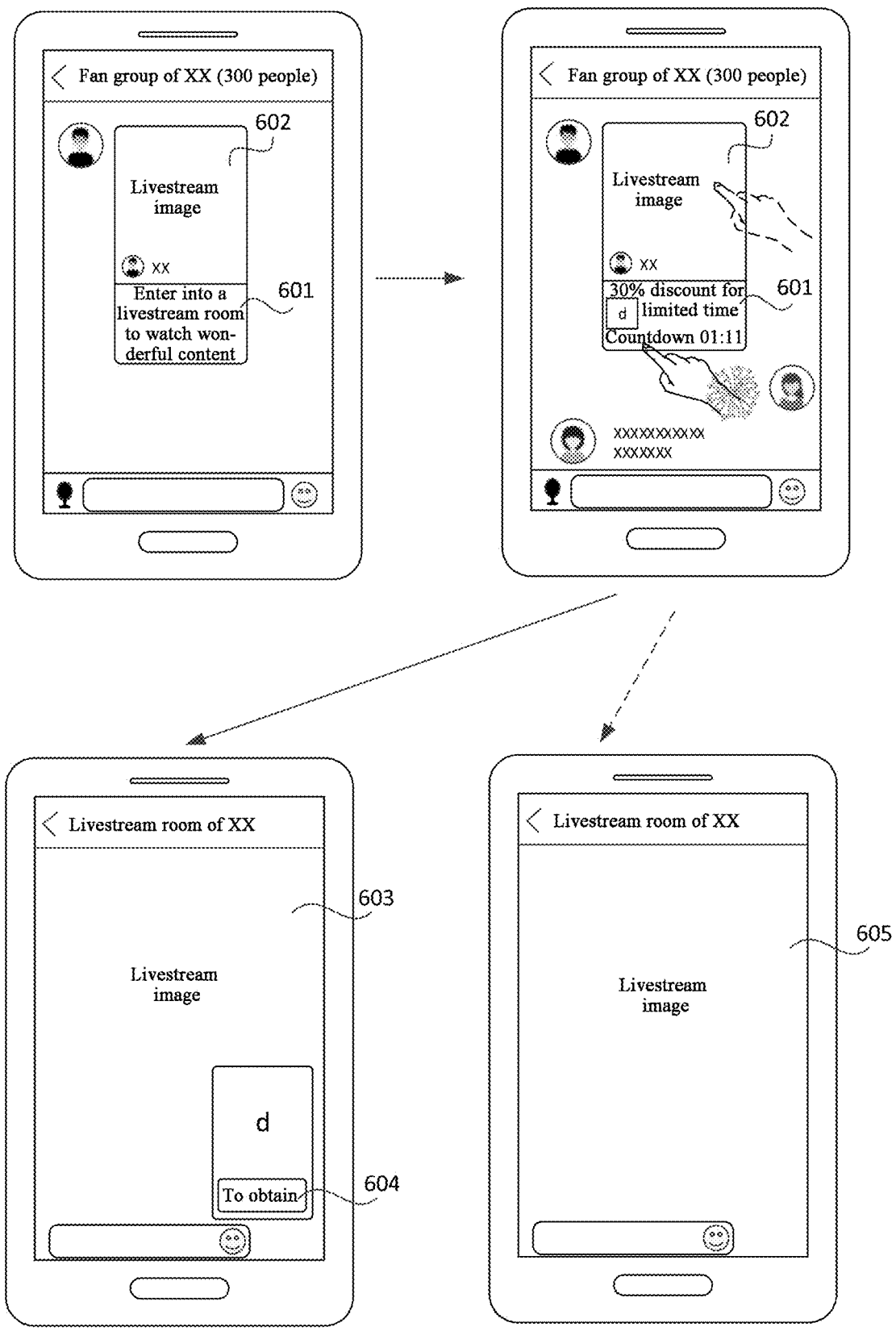
FIG. 6 is a schematic diagram of interaction of an interface according to an example of the present disclosure.

FIG. 5 is a schematic flow chart of a method for information processing according to an example of the present disclosure. The example of the present disclosure is adjusted based on each example in the above embodiments. FIG. 6 is a schematic diagram of interaction of an interface according to an example of the present disclosure. The example of the present disclosure may be understood in combination with FIGS. 5 and 6.

The method may comprise:

Step 501, receiving an instruction of displaying a livestream room control in a session interface of a target session.

Step 502, determining whether a preset livestream room corresponding to the livestream room control satisfies a preset display condition, and if yes, executing step 504; and otherwise, executing step 503.

The preset display condition comprises that the preset livestream room is in a livestreaming state and at least one preset event in the preset livestream room is in a triggered state, and at least one session member in the target session pushes the preset livestream room to the target session. Illustratively, the target session is created by a streamer account of the preset livestream room, and the streamer account pushes the preset livestream room to the target session in a form of a session message, which may be displayed in a form of a session card.

Illustratively, the preset event comprises that a preset resource (for which the current user has obtainment permission) is issued, that the preset object is in a preset state, that the streamer account participates in the first preset theme project, and that the streamer account initiates the second preset theme project. For example, the preset resource comprises a coupon, the preset object comprises a commodity, the preset state comprises a time-limited discount, the first preset theme project comprises a PK project, and the second preset theme project comprises microphone connection.

Step 503, displaying the livestream room control in a second area in the session interface, and returning to execute step 502.

As shown in FIG. 6, assuming that after a streamer account pushes a preset livestream room to a target session in a form of a session message, an instruction of displaying a livestream room control in a session interface of the target session is received. If it is determined that the preset livestream room currently does not satisfy a preset display condition, a session card (which may also be called as a livestream card) may be displayed in the session interface. The session card comprises a first area 601 and a second area 602, wherein the livestream room control may be displayed in the second area 602, the livestream room control is configured to display a livestream image of the preset livestream room and provide a livestream room entrance, and a preset copy may be displayed in the first area 601, such as "enter into the livestream room to watch wonderful content" as shown in the figure. Then, it is continued to determine whether the preset livestream room satisfies the preset display condition. If so, step 504 is entered into to update the content displayed in the first area 601.

Step 504, determining whether a number of preset events currently in a triggered state is greater than 1. If yes, step 505 is executed and otherwise step 506 is executed.

Illustratively, assuming that both the coupon issuance and the time-limited discount on the commodity are currently in the triggered state, step 505 is executed; and if only the time-limited discount on the commodity is currently in the triggered state, step 506 is executed.

Step 505, obtaining event priority information, determining a target preset event according to the event priority information, and executing step 507.

Illustratively, event priorities of the following are from high to low: coupon issuance, time-limited discount on the commodity, the streamer account participating in a PK project, and the streamer account initiating microphone connection. If both the coupon issuance and the time-limited discount on the commodity are currently in the triggered state, it is determined that the coupon issuance is the target preset event.

Step 506, determining the preset event currently in the triggered state as the target preset event.

Step 507, displaying the livestream room control in the second area in the session interface, and displaying associated information of the preset event in the first area associated with the second area in the session interface.

Illustratively, assuming that the target preset event is the time-limited discount on the commodity, and there are multiple commodities participating in the time-limited discount, an attribute change index of each commodity may be obtained and a target commodity may be further determined. As shown in FIG. 6, assuming that the target commodity is a commodity "d", a legend, discount information, and countdown information of the commodity "d" may be displayed in the first area 601.

Step 508, updating associated information displayed in the first area under the condition of detecting that the preset event changes.

Illustratively, the countdown information may be updated in real time, and if the countdown ends, it may be switched to information related to the time-limited discount on another commodity. If there are no commodities participating in the time-limited discount, and the streamer account initiates microphone connection, information related to the microphone connection may be updated and displayed. If the preset display condition has not been satisfied in this case, a preset copy may be restored.

Step 509, in response to a preset trigger operation for the first area, entering into a livestream interface of the preset livestream room to execute at least one of the following: displaying interface information matching the associated information, and executing an operation matching the associated information automatically.

Illustratively, assuming that the current user triggers the first area 601 in a manner of clicking, the current user may enter into the livestream interface 603 of the preset livestream room, and a commodity card control is popped up in the livestream interface 603, and an access entrance 604 of the commodity "d" is displayed in the commodity card control. For example, if the user triggers the access entrance 604, a detailed interface for the commodity "d" may be accessed.

Illustratively, assuming that the current user triggers the second area 602 in a manner of clicking, the current user enters into the livestream interface 605 of the preset livestream room. In this case, the livestream interface 605 may not display the content related to the commodity "d" temporarily.

According to the method for information processing according to the example of the present disclosure, the streamer account can push the own livestream room in the form of the session card in the target session created by the streamer account in a livestream process. If there is the preset event in the triggered state, the livestream information is displayed in the second area of the session card, the livestream room entrance is provided, and the associated information of the preset event is displayed in the first area of the session card. When there are multiple preset events satisfying the condition, the target preset event is selected according to the event priority information to perform the priority display of the associated information. Then, the associated information displayed in the first area is updated dynamically such that the current user can know the dynamic updates of the livestream room in real time in a chat process conveniently. If the current user views the associated information in which the current user is interested, the first area can be triggered to enter into the livestream room, and moreover, the interface information matching the associated information is displayed and/or the operation matching the associated information is executed automatically, thereby reducing user operations, providing convenience for the user, and improving the interaction efficiency.

Figure 7:
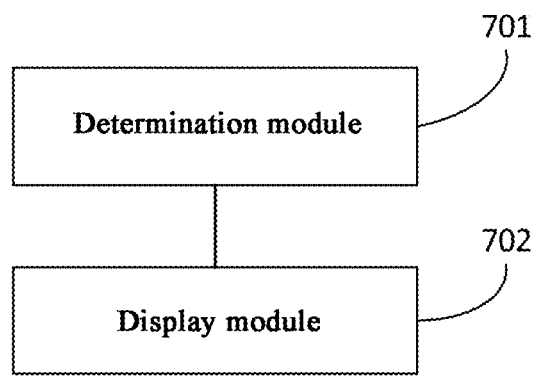
FIG. 7 is a structural block diagram of an apparatus for information processing according to an example of the present disclosure.

FIG. 7 is a structural block diagram of an apparatus for information processing according to an example of the present disclosure. The apparatus may be implemented by at least one of software and hardware, and may generally be integrated in an electronic device, and can process information by executing a method for information processing. As shown in FIG. 7, the apparatus comprises:

a determination module 701 configured to determine, in response to receiving an instruction of displaying a livestream room control in a session interface of a target session, whether a preset livestream room corresponding to the livestream room control satisfies a preset display condition, wherein the preset display condition comprises that the preset livestream room is in a livestreaming state and at least one preset event in the preset livestream room is in a triggered state; and a display module 702 configured to display the livestream room control in the session interface and display associated information of the at least one preset event in a first area in the session interface in response to determining that the preset livestream room corresponding to the livestream room control satisfies the preset display condition.

According to the apparatus for information processing provided in the example of the present disclosure, it is determined that the preset livestream room corresponding to the livestream room control is in the livestreaming state and the at least one preset event in the preset livestream room is in the triggered state in response to receiving the instruction of displaying the livestream room control in the session interface of the target session, such that the livestream room control is displayed in the session interface, and the associated information of the preset event is displayed in the first area in the session interface. With employment of the above embodiments, when the instruction of displaying the livestream room control is received in the current session interface, if it is determined that the corresponding livestream room is in the livestreaming state and the preset event is in a triggered state, the associated information of the preset event is displayed while the livestream room control is displayed in the session interface. As such, the session member can know the associated information of the preset event currently in the triggered state in the livestream room in a process of chatting in the session interface conveniently, and know the dynamic updates in the livestream room better.

In an embodiment, a first preset association relation exists between the preset livestream room and at least one session member in the target session.

In an embodiment, the first preset association relation existing between the preset livestream room and at least one session member in the target session comprises: displaying the preset livestream room based on the at least one session member in the target session to the target session, such that the livestream room control is displayed in the session interface of the target session.

In an embodiment, the session interface comprises a second area, wherein the second area is configured to display the livestream room control, and the first area is associated with the second area; and the livestream room control satisfies at least one of the following: the livestream room control is configured to display livestream information of the preset livestream room, and the livestream room control is configured to provide a livestream room entrance of the preset livestream room.

In an embodiment, the apparatus further comprises: a display control module configured to control display of the first area based on a preset display control mode, wherein the preset display control mode comprises at least one of a display position, a display size, a display state, display duration, a display frequency and a number of times of display.

In an embodiment, the at least one preset event comprises an event having a second preset association relation with a current user.

In an embodiment, the at least one preset event comprises that a preset resource for which a current user has obtainment permission is issued, and the associated information of the at least one preset event comprises resource attribute information of the issued preset resource.

In an embodiment, the at least one preset event comprises that a preset object associated with the preset livestream room is in a preset state, and the associated information of the at least one preset event comprises at least one of state information and object attribute information of the preset object in the preset state.

In an embodiment, the display module comprises:

an index obtaining unit configured to under the condition that the preset display condition is satisfied, obtaining, in response to determining a plurality of preset objects currently in the preset state, attribute change indexes of the preset objects, wherein the attribute change indexes are configured to measure a degree of deviation of a current attribute value of a preset attribute of the preset object from an original attribute value;

a target preset object determination unit configured to determine a target preset object according to the attribute change indexes; and a first display unit configured to display at least one of state information and object attribute information of the target preset object in the first area in the session interface.

In an embodiment, the preset event comprises that a streamer account participates in a first preset theme project, and the associated information of the preset event comprises participation information of the streamer account in the first preset theme project, wherein the first preset theme project comprises interaction between different streamer accounts.

In an embodiment, the preset event comprises that a streamer account participates in a second preset theme project, and the associated information of the preset event comprises project information of the second preset theme project, wherein the second preset theme project comprises interaction between the streamer account and a viewer account.

In an embodiment, the display module comprises:

a priority information obtaining unit configured to obtain event priority information in response to determining a plurality of preset events currently in the triggered state under the condition that the preset display condition is satisfied;

a target preset event determination unit configured to determine a target preset event according to the event priority information; and a second display unit configured to display associated information corresponding to the target preset event in the first area in the session interface.

In an embodiment, the apparatus further comprises:

an update module configured to update the associated information displayed in the first area in response to detecting that a state of the at least one preset event changes after the displaying associated information of the at least one preset event in a first area in the session interface.

In an embodiment, the updating the associated information displayed in the first area in response to detecting that the state of the at least one preset event changes comprises: updating the associated information displayed in the first area according to current progress information in response to detecting that progress information of the at least one preset event changes.

In an embodiment, the updating the associated information displayed in the first area in response to detecting that the state of the at least one preset event changes comprises: determining whether a second preset event in the triggered state exists in response to detecting that the triggered state of a first preset event corresponding to first associated information that is currently displayed ends, and switching to displaying second associated information corresponding to the second preset event in the first area in the session interface in response to detecting that the second preset event in the triggered state exists.

In an embodiment, the apparatus further comprises:

a trigger response module configured to enter, in response to a preset trigger operation for the first area, into a livestream interface of the preset livestream room to execute at least one of the following after the displaying associated information of the at least one preset event in the first area in the session interface: displaying interface information matching the associated information, and executing an operation matching the associated information automatically.

In an embodiment, the executing the operation matching the associated information automatically comprises: adding a preset resource corresponding to the associated information to an account of a current user and displaying a use entrance corresponding to the preset resource added in response to determining that the at least one preset event comprises that the preset resource for which the current user has obtainment permission is issued.

In an embodiment, the displaying interface information matching the associated information comprises: displaying an access entrance of a preset object corresponding to the associated information in response to determining that the at least one preset event comprises that the preset object is in a preset state.

Figure 8:
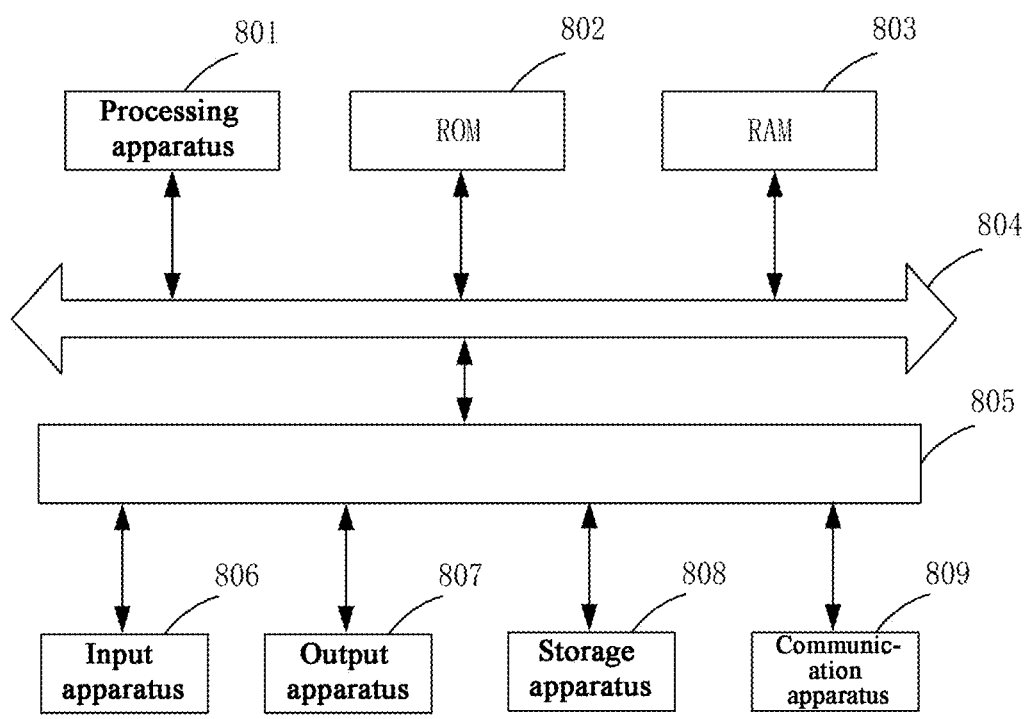
FIG. 8 is a structural block diagram of an electronic device according to an example of the present disclosure.

With reference to FIG. 8 below, a schematic structural diagram of an electronic device 800 suitable for implementing embodiments of the present disclosure is shown. The electronic device in an embodiment of the present disclosure may comprise, but not limited to, a mobile terminal such as a mobile phone, a notebook computer, a digital broadcasting receiver, a PDA, a PAD, a portable media player (PMP) and a vehicle-mounted terminal (e.g., a vehicle-mounted navigation terminal) and a fixed terminal such as a television (TV) and a desktop computer. The electronic device shown in FIG. 8 is merely an example and should not bring any limitation to functions and the scope of use of the example of the present disclosure.

As shown in FIG. 8, the electronic device 800 may comprise a processing apparatus (such as a central processing unit and a graphics processing unit) 801 that may execute various suitable actions and processes according to programs stored in a read-only memory (ROM) 802 or programs loaded from a storage apparatus 808 into a random access memory (RAM) 803. Various programs and data required for operation of the electronic device 800 are further stored in the RAM 803. The processing apparatus 801, the ROM 802 and the RAM 803 are connected to each other by means of a bus 804. An input/output (I/O) interface 805 is also connected to the bus 804.

Usually, the following apparatuses may be connected to the I/O interface 805: input apparatuses 806 including a touch screen, a touchpad, a keyboard, a mouse, a camera, a microphone, an accelerometer and a gyroscope, for example; output apparatuses 807 including a liquid crystal display (LCD), a speaker and a vibrator, for example; storage apparatuses 808 including a magnetic tape and a hard drive, for example; and a communication apparatus 809. The communication apparatus 809 may allow the electronic device 800 to perform wireless or wired communication with other devices to exchange data. Although FIG. 8 shows the electronic device 800 having various apparatuses, it should be understood that not all of the illustrated apparatuses are required to be implemented or provided. More or fewer apparatuses may be alternatively implemented or provided.

Specifically, according to the example of the present disclosure, a process described above with reference to the flow chart may be implemented as a computer software program. For example, an example of the present disclosure comprises a computer program product. The computer program product comprises a computer program carried on a non-transitory computer-readable medium, where the computer program comprises program codes configured to execute the method shown in the flow chart. In such an example, the computer program may be downloaded and mounted from a network by means of the communication apparatus 809, or mounted from the storage apparatus 808, or mounted from the ROM 802. When the computer program is executed by the processing apparatus 801, the functions described above defined in the method of the example of the present disclosure are executed.

It should be noted that the computer-readable medium of the present disclosure may be a computer-readable signal medium, a computer-readable storage medium, or any combination of the computer-readable signal medium and the computer-readable storage medium. The computer-readable storage medium may be, for example, but not limited to, systems, apparatuses or devices relating to electricity, magnetism, light, electromagnetism, infrared rays or semiconductors, or any combination of the above. The examples of the computer-readable storage medium may comprise, but not limited to: an electrically connected and portable computer disk having one or more wires, a hard drive, a RAM, a ROM, an erasable programmable read-only memory (EPROM) or flash, an optical fiber, a portable compact disk read-only memory (CD-ROM), an optical storage device, a magnetic storage device, or any suitable combination of the above. In the present disclosure, the computer-readable storage medium may be any tangible medium that comprises or stores a program that may be used by an instruction execution system, apparatus, or device or in combination with the instruction execution system, apparatus, or device. In the present disclosure, the computer-readable signal medium may comprise data signals propagating in a baseband or as part of a carrier wave, which carry computer-readable program codes. The data signal propagating may take various forms, including, but not limited to, an electromagnetic signal, an optical signal, or any suitable combination of the above. The computer-readable signal medium may further be any computer-readable medium apart from the computer-readable storage medium, and the computer-readable signal medium may send, propagate, or transmit programs used by the instruction execution system, apparatus, or device or in combination with the instruction execution system, apparatus, or device. Program codes comprised on the computer-readable medium may be transmitted by using any suitable medium, including, but not limited to, wire, optical cable, radio frequency (RF), etc., or any suitable combination of the above.

In some embodiments, a client and a server may communicate by utilizing any currently known or future developed network protocol such as a hypertext transfer protocol (HTTP), and may interconnect with digital data communication (for example, communication network) in any form or through any medium. An example of the communication network comprises a local area network (LAN), a wide area network (WAN), an internet work (for example, the Internet), an end-to-end network (for example, ad hoc end-to-end network), as well as any currently known or future developed network.

The computer-readable medium described above may be comprised in the electronic device described above, or exist separately without being assembled into the electronic device.

The computer-readable medium carries one or more programs. When executed by the electronic device, the one or more programs cause the electronic device to determine, in response to receiving an instruction of displaying a livestream room control in a session interface of a target session, whether a preset livestream room corresponding to the livestream room control satisfies a preset display condition, where the preset display condition comprises that the preset livestream room is in a livestreaming state and at least one preset event in the preset livestream room is in a triggered state; and display the livestream room control in the session interface, and display associated information of the preset event in a first area in the session interface in response to determining that the preset livestream room corresponding to the livestream room control satisfies the preset display condition.

The storage medium may be a non-transitory storage medium.

Computer program codes configured to execute operations of the present disclosure may be written in one or more programming languages or a combination of the programming languages. The programming languages described above comprise object-oriented programming languages such as Java, Smalltalk and C++, and further comprise conventional procedural programming languages such as "C" programming language or similar programming languages. The program codes may be executed entirely on a user computer, executed partially on the user computer, executed as a stand-alone software package, executed partially on the user computer and partially on a remote computer, or executed entirely on the remote computer or a server. Where the remote computer is involved, the remote computer may be connected to the user computer by means of any kind of network, including the LAN or the WAN, or may be connected to an external computer (for example, the remote computer is connected by means of the Internet by an Internet service provider).

Flow charts and block diagrams in the accompanying drawings illustrate system structures, functions and operations, which may be implemented according to systems, methods and computer program products in the various embodiments of the present disclosure. In this regard, each block in flow charts or block diagrams may represent a module, a program segment, or a part of codes, which may comprise one or more executable instructions configured to implement logical functions specified. It should also be noted that in some alternative implementations, functions noted in the blocks may also occur in sequences different from those in the accompanying drawings. For example, the functions represented by two continuous blocks may be actually implemented basically in parallel, sometimes implemented in reverse sequences, which depends on the involved functions. It should also be noted that each block in the block diagrams and/or the flow charts, and combinations of the blocks in the flow charts and/or the block diagrams, may be implemented by using dedicated hardware-based systems that implement the specified functions or operations, or may be implemented by using combinations of dedicated hardware and computer instructions.

The modules described in the embodiments of the present disclosure may be implemented in software or hardware. In some cases, the name of the module does not constitute a limitation on the module itself. For example, a display module may further be described as "a module displaying a livestream room control in a session interface and displaying associated information of a preset event in a first area in the session interface in response to determining that a preset livestream room corresponding to the livestream room control satisfies the preset display condition".

The functions described above herein may be at least partially executed by one or more hardware logic components. For example, exemplary types of hardware logic components that may be used comprise, without limitation: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may comprise or store a program used by the instruction execution system, apparatus, or device or in combination with the instruction execution system, apparatus, or device. The machine-readable medium may be a machine-readable signal medium or a machine-readable storage medium. The machine-readable medium may comprise, but not limited to, an electronic, magnetic, optical, electromagnetic, infrared, or semiconductor system, apparatus, or device, or any suitable combination of the above. The examples of the machine-readable storage medium may comprise an electrically connected and portable computer diskette based on one or more wires, a hard disk, an RAM, an ROM, an EPROM, or a flash memory, an optical fiber, a portable CD-ROM, an optical storage device, a magnetic storage device, or any suitable combination of the above.

According to one or more embodiments of the present disclosure, a method for information processing is provided. The method comprises:

determine, in response to receiving an instruction of displaying a livestream room control in a session interface of a target session, whether a preset livestream room corresponding to the livestream room control satisfies a preset display condition, where the preset display condition comprises that the preset livestream room is in a livestreaming state and at least one preset event in the preset livestream room is in a triggered state; and displaying the livestream room control in the session interface and displaying associated information of the at least one preset event in a first area in the session interface in response to determining that the preset livestream room corresponding to the livestream room control satisfies the preset display condition.

According to one or more embodiments of the present disclosure, a first preset association relation exists between the preset livestream room and at least one session member in the target session.

According to one or more embodiments of the present disclosure, the first preset association relation existing between the preset livestream room and the at least one session member in the target session comprises: displaying the preset livestream room based on the at least one session member in the target session to the target session, such that the livestream room control is displayed in the session interface of the target session.

According to one or more embodiments of the present disclosure, the session interface comprises a second area, wherein the second area is configured to display the livestream room control, and the first area is associated with the second area; and the livestream room control satisfies at least one of the following: the livestream room control is configured to display livestream information of the preset livestream room, and the livestream room control is configured to provide a livestream room entrance of the preset livestream room.

According to one or more embodiments of the present disclosure, the method further comprises:

displaying of the first area based on a preset display control mode, wherein the preset display control mode comprises at least one of a display position, a display size, a display state, display duration, a display frequency and the number of times of display.

According to one or more embodiments of the present disclosure, the at least one preset event comprises an event having a second preset association relation with a current user.

According to one or more embodiments of the present disclosure, the at least one preset event comprises that a preset resource for which a current user has obtainment permission is issued, and the associated information of the at least one preset event comprises resource attribute information of the issued preset resource.

According to one or more embodiments of the present disclosure, the at least one preset event comprises that a preset object associated with the preset livestream room is in a preset state, and the associated information of the at least one preset event comprises at least one of state information and object attribute information of the preset object in the preset state.

According to one or more embodiments of the present disclosure, the displaying associated information of the at least one preset event in the first area in the session interface comprises:

obtaining, in response to determining a plurality of preset objects currently in the preset state, attribute change indexes of the multiple preset objects, wherein the attribute change indexes are configured to measure a degree of deviation of a current attribute value of a preset attribute of the preset object from an original attribute value;

determining a target preset object according to the attribute change indexes; and displaying at least one of state information and object attribute information of the target preset object in the first area in the session interface.

According to one or more embodiments of the present disclosure, the preset event comprises that a streamer account participates in a first preset theme project, and the associated information of the preset event comprises participation information of the streamer account in the first preset theme project, wherein the first preset theme project comprises interaction between different streamer accounts.

According to one or more embodiments of the present disclosure, the preset event comprises that a streamer account participates in a second preset theme project, and the associated information of the preset event comprises project information of the second preset theme project, wherein the second preset theme project comprises interaction between the streamer account and a viewer account.

According to one or more embodiments of the present disclosure, the displaying associated information of the at least one preset event in a first area in the session interface comprises:

obtaining event priority information in response to determining a plurality of preset events currently in the triggered state;

determining a target preset event according to the event priority information; and displaying associated information corresponding to the target preset event in the first area in the session interface.

According to one or more embodiments of the present disclosure, after the displaying associated information of the at least one preset event in the first area in the session interface, the method comprises:

updating the associated information displayed in the first area in response to detecting that a state of the at least one preset event changes.

According to one or more embodiments of the present disclosure, the updating the associated information displayed in the first area in response to detecting that the state of the at least one preset event changes comprises:

updating the associated information displayed in the first area according to current progress information in response to detecting that progress information of the at least one preset event changes.

According to one or more embodiments of the present disclosure, the updating the associated information displayed in the first area in response to detecting that the state of the at least one preset event changes comprises:

in response to detecting that the triggered state of a first preset event corresponding to first associated information that is currently displayed ends, deciding whether a second preset event in the triggered state exists and switching to displaying second associated information corresponding to the second preset event in the first area in the session interface in response to detecting that the second preset event in the triggered state exists.

According to one or more embodiments of the present disclosure, after the displaying associated information of the at least one preset event in the first area in the session interface, the method further comprises:

entering, in response to a preset trigger operation for the first area, into a livestream interface of the preset livestream room to execute at least one of the following: displaying interface information matching the associated information, and executing an operation matching the associated information automatically.

According to one or more embodiments of the present disclosure, the executing an operation matching the associated information automatically comprises:

adding a preset resource corresponding to the associated information to an account of a current user and displaying a use entrance corresponding to the preset resource added in response to determining that the at least one preset event comprises that the preset resource for which the current user has obtainment permission is issued.

According to one or more embodiments of the present disclosure, the displaying the interface information matching the associated information comprises:

displaying an access entrance of a preset object corresponding to the associated information in response to determining that the at least one preset event comprises that the preset object is in a preset state.

According to one or more embodiments of the present disclosure, an apparatus for information processing is provided. The apparatus comprises:

a determination module configured to determine, in response to receiving an instruction of displaying a livestream room control in a session interface of a target session, whether a preset livestream room corresponding to the livestream room control satisfies a preset display condition, wherein the preset display condition comprises that the preset livestream room is in a livestreaming state and at least one preset event in the preset livestream room is in a triggered state; and a display module configured to display the livestream room control in the session interface and display associated information of the preset event in a first area in the session interface in response to determining that the preset livestream room corresponding to the livestream room control satisfies the preset display condition.

The method and apparatus for information processing, a device, and a storage medium are provided in the embodiments of the present disclosure, which can optimize processing of the associated information of the livestream room.

Those skilled in the art should understand that the disclosed scope involved in the present disclosure is not limited to the embodiments formed from specific combinations of the technical features described above, and should also cover other embodiments formed from any combination of the technical features described above or equivalent features of the technical features without departing from the disclosed concept described above. For example, the embodiments formed by replacing the features described above with the technical features having similar functions disclosed in (but not limited to) the present disclosure.

Furthermore, although each operation is described in a specific order, this should not be understood as requiring the operations to be executed in the specific order shown or in a sequential order. In certain environments, multitasking and parallel processing may be advantageous. Similarly, although several specific implementation details are comprised in the above discussion, these details should not be interpreted as limiting the scope of the present disclosure. Certain features described in the context of a single example can further be implemented in a single example in a combined manner. On the contrary, various features described in the context of a single example can also be implemented in a plurality of embodiments separately or in any suitable sub-combination manner.

Although the subject matter has been described in language specific to structural features and/or method logical actions, it should be understood that the subject matter defined in the appended claims may not necessarily be limited to the specific features or actions described above. On the contrary, the specific features and actions described above are merely exemplary forms to implement the claims.

The invention claimed is:

1. A method of information processing, comprising:
    determining, in response to receiving an instruction of displaying a livestream room control in a session interface of a target session, whether a preset livestream room corresponding to the livestream room control satisfies a preset display condition, wherein the preset display condition comprises that the preset livestream room is in a livestreaming state and at least one preset event in the preset livestream room is in a triggered state; and
    in response to the preset display condition being satisfied, displaying a livestream card in a session message display region of the session interface, displaying the livestream room control in a second area of the livestream card and displaying associated information of the at least one-preset event in a first area of the livestream card, the livestream room control being configured to display livestream images of livestream information of the preset livestream room; and/or
    in response to the preset display condition being not satisfied, displaying the livestream room control in the session message display region of the session interface, the livestream room control displaying the livestream image of the livestream information of the preset livestream room when the preset livestream room is in a livestreaming state.

2. The method according to claim 1, wherein a first preset association relation exists between the preset livestream room and at least one session member in the target session.

3. The method according to claim 2, wherein the first preset association relation existing between the preset livestream room and the at least one session member in the target session comprises: displaying the preset livestream room based on the at least one session member in the target session to the target session, such that the livestream room control is displayed in the session interface of the target session.

4. The method according to claim 2, wherein the livestream room control is further configured to provide a livestream room entrance of the preset livestream room, the first area associated with the second area.

5. The method according to claim 1, further comprising:
    displaying the first area based on a preset display control mode,
    wherein the preset display control mode comprises at least one of a display position, a display size, a display state, display duration, a display frequency and a number of times of display.

6. The method according to claim 1, wherein the at least one preset event comprises an event having a second preset association relation with a current user.

7. The method according to claim 1, wherein the at least one preset event comprises that a preset resource for which a current user has obtainment permission is issued, and the associated information of the preset event comprises resource attribute information of the issued preset resource.

8. The method according to claim 1, wherein the at least one preset event comprises that a preset object associated with the preset livestream room is in a preset state, and the associated information of the preset event comprises state information and/or object attribute information of the preset object in the preset state.

9. The method according to claim 8, wherein the displaying the associated information of the preset event in the first area of the livestream card comprises:
    obtaining, in response to determining a plurality of preset objects currently in the preset state, attribute change indexes of respective preset objects, wherein the attribute change indexes are configured to measure a degree of deviation of a current attribute value of a preset attribute of the preset object from an original attribute value;
    determining a target preset object according to the attribute change indexes; and
    displaying state information and/or object attribute information of the target preset object in the first area of the livestream card.

10. The method according to claim 1, wherein the preset event comprises that a streamer account participates in a first preset theme project, and the associated information of the preset event comprises participation information of the streamer account in the first preset theme project, wherein the first preset theme project comprises interaction between different streamer accounts.

11. The method according to claim 1, wherein the preset event comprises that a streamer account participates in a second preset theme project, and the associated information of the preset event comprises project information of the second preset theme project, wherein the second preset theme project comprises interaction between a streamer account and a viewer account.

12. The method according to claim 1, wherein the displaying the associated information of the preset event in the first area of the livestream card comprises:
    obtaining event priority information in response to determining a plurality of preset events currently in the triggered state;
    determining a target preset event according to the event priority information; and
    displaying associated information corresponding to the target preset event in the first area of the livestream card.

13. The method according to claim 1, comprising after the displaying the associated information of the preset event in the first area of the livestream card:
    updating the associated information displayed in the first area in response to detecting that a state of the at least one preset event changes.

14. The method according to claim 13, wherein the updating the associated information displayed in the first area in response to detecting that the state of the preset event changes comprises:
    updating the associated information displayed in the first area according to current progress information in response to detecting that progress information of the preset event changes.

15. The method according to claim 13, wherein the updating the associated information displayed in the first area in response to detecting that the state of the preset event changes comprises:
    deciding whether a second preset event in the triggered state exists in response to detecting that the triggered state of a first preset event corresponding to first associated information being currently displayed ends, and switching to displaying second associated information corresponding to the second preset event in the first area in the session interface in response to the second preset event in the triggered state existing.

16. The method according to claim 1, further comprising after the displaying associated information of the preset event in the first area of the livestream card:
    in response to a preset trigger operation for the first area, entering into a livestream interface of the preset livestream room to execute: displaying interface information matching the associated information, and/or automatically executing an operation matching the associated information.

17. The method according to claim 16, wherein the automatically executing the operation matching the associated information comprises:
in response to that the preset event comprises that a preset resource for which a current user has obtainment permission is issued, adding a preset resource corresponding to the associated information to an account of the current user and displaying a use entrance corresponding to the added preset resource.

18. The method according to claim 16, wherein the displaying the interface information matching the associated information comprises:
displaying an access entrance of a preset object corresponding to the associated information in response to determining that the preset event comprises that the preset object is in a preset state.

19. An electronic device, comprising a memory, a processor and a computer program stored on the memory and runnable on the processor, the computer program, when executed by the processor, causing the processor to:
determine, in response to receiving an instruction of displaying a livestream room control in a session interface of a target session, whether a preset livestream room corresponding to the livestream room control satisfies a preset display condition, wherein the preset display condition comprises that the preset livestream room is in a livestreaming state and at least one preset event in the preset livestream room is in a triggered state; and
in response to the preset display condition being satisfied, display a livestream card in a session message display region of the session interface, display the livestream room control in a second area of the livestream card and display associated information of the preset event in a first area of the livestream card, the livestream room control being configured to display livestream images of livestream information of the preset livestream room; and/or
in response to the preset display condition being not satisfied, display the livestream room control in the session message display region of the session interface, the livestream room control displaying the livestream image of the livestream information of the preset livestream room when the preset livestream room is in a livestreaming state.

20. A computer-readable storage medium, storing a computer program, the computer program, when executed by a processor, causing the processor to:
determine, in response to receiving an instruction of displaying a livestream room control in a session interface of a target session, whether a preset livestream room corresponding to the livestream room control satisfies a preset display condition, wherein the preset display condition comprises that the preset livestream room is in a livestreaming state and at least one preset event in the preset livestream room is in a triggered state; and
in response to the preset display condition being satisfied, display a livestream card in a session message display region of the session interface, display the livestream room control in a second area of the livestream card and display associated information of the preset event in a first area of the livestream card, the livestream room control being configured to display livestream images of livestream information of the preset livestream room; and/or
in response to the preset display condition being not satisfied, display the livestream room control in the session message display region of the session interface, the livestream room control displaying the livestream image of the livestream information of the preset livestream room when the preset livestream room is in a livestreaming state.

* * * * *